United States Patent [19]
Jennings

[11] 3,899,816
[45] Aug. 19, 1975

[54] PRESS FOR PALLET DISASSEMBLY

[75] Inventor: Donald G. Jennings, Staten Island, N.Y.

[73] Assignee: Distribution Supply Corporation, Westfield, N.J.

[22] Filed: July 12, 1974

[21] Appl. No.: 483,304

[52] U.S. Cl..................... 29/200 D; 29/244; 29/252
[51] Int. Cl.² ......................................... B23P 19/00
[58] Field of Search .......... 29/200 D, 200 R, 200 P, 29/426, 427, 200 S, 244, 200 B, 252

[56] References Cited
UNITED STATES PATENTS

| | | | |
|---|---|---|---|
| 2,593,843 | 4/1952 | Cannon........................ | 29/200 D X |
| 3,512,242 | 5/1970 | Harvis.................................... | 29/252 |
| 3,740,815 | 6/1973 | Campbell et al.................. | 29/200 D |
| 3,846,890 | 11/1974 | Bielkiewicz....................... | 29/200 D |

Primary Examiner—Victor A. DiPalma
Attorney, Agent, or Firm—Peter L. Tailer

[57] ABSTRACT

A press for the disassembly of broken pallets has fingers about which a pallet is placed, thin hold down members which extend between the top boards of the pallet to engage and hold down its stringers while the fingers are raised by a first set of air cylinders to remove the top boards of the pallet, and finger hold down means that hold down the fingers while a second set of air cylinders pushes the stringers upward to remove them from pallet bottom boards and complete the disassembly of the pallet. The thin hold down members that extend between the top boards of a pallet are longitudinally slidable on a pivoted rack so that they may be moved to accommodate variations in pallets.

8 Claims, 6 Drawing Figures

PRESS FOR PALLET DISASSEMBLY

BACKGROUND OF THE INVENTION

Wooden pallets as used in food distribution and the like are standardized as to size. When pallets are broken, they are disassembled so that their top and bottom boards and their stringers may be reused to repair or build new pallets. The disassembly of pallets is costly and very time consuming using hand tools. Further, very tough wood is used in pallet construction so that the hand disassembly of pallets often results in the breakage or damage of boards. The press of this invention is a safe, fast, and efficient press that greatly reduces labor in the disassembly of pallets.

DESCRIPTION OF THE PREFERRED EMBODIMENTS

Figure 1:
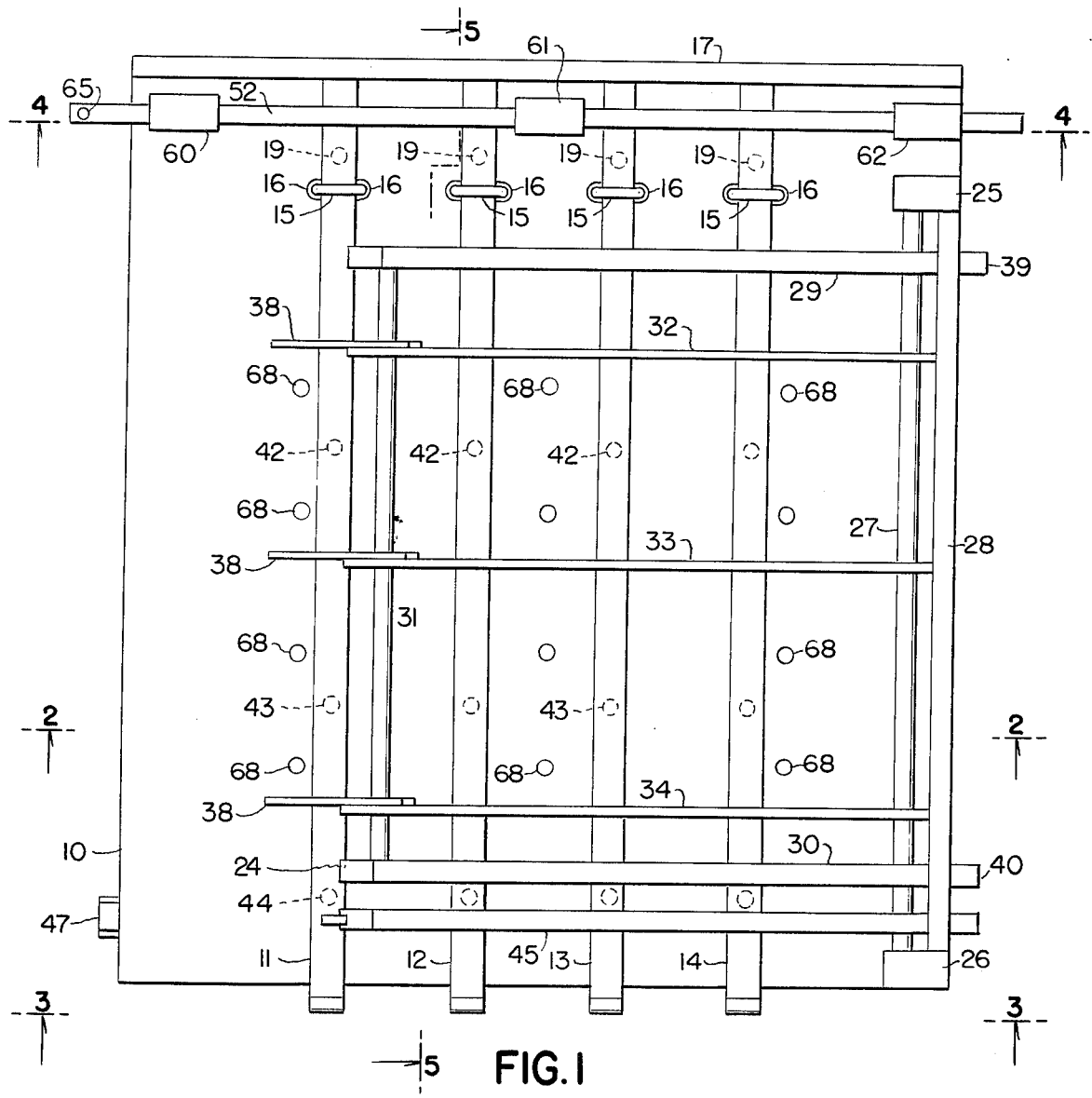
FIG. 1 is a top view of the pallet disassembly press of this invention with its stringer hold down rack and its front finger hold down in raised positions.

Referring to FIGS. 1 through 5, the press of this invention has a box-like base 10 over which extend the fingers 11, 12, 13, and 14. Each finger 11-14 extends through an inverted U-shaped guide 15 to which it is slidably secured for vertical motion by staples 16 which slide vertically on the sides of the guides 15. A transverse rear member 17 contains four vertical slots 18' in which the back ends of the fingers 11-14 extend. Four pneumatic cylinders 18 extend their rods 19 to raise the fingers 11-14 from base 10 to be cantilevered above it from its back end.

Figure 2:
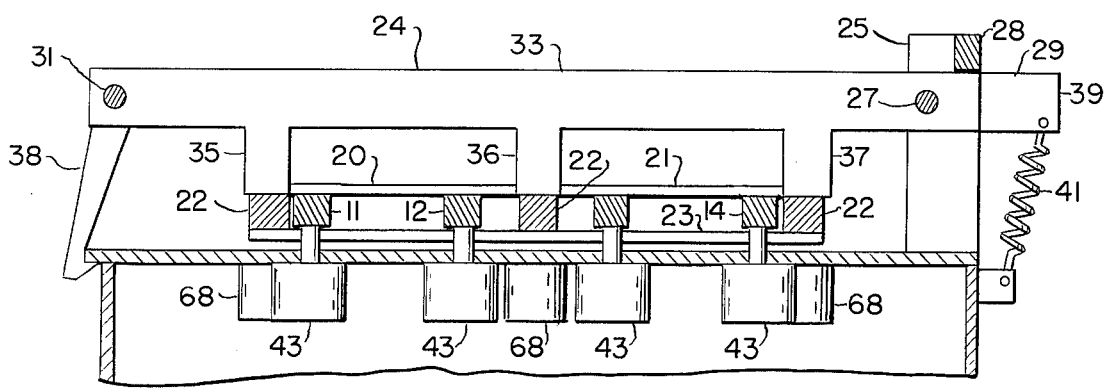
FIG. 2 is a section taken on line 2—2 of FIG. 1 with the stringer hold down rack shown lowered with a thin hold down engaging the stringers of a pallet.

A pallet 20 having top boards 21, stringers 22, and bottom boards 23 is placed on the fingers 11-14 as shown in FIG. 2. Cylinders 18 are de-activated to lower the fingers 11-14 and the pivotally mounted rack 24 is lowered. Rack 24, as shown in FIGS. 1 and 2, has end supports 25 and 26 between which there extends a rod 27 and a heavy bar 28. Rack side members 29 and 30 pivot on rod 27 and have their front ends joined by a second rod 31. Slidably disposed on rods 27 and 31 are the thin hold downs 32, 33, and 34. The hold downs 32-34 each have three projections 35, 36, and 37 which extend between top boards 21 of a pallet 20 to each engage a stringer 22. Hooks 38 engage the base 10 when rack 24 is lowered and the pivoted ends of the hold downs 32-34 are engaged by the lower edge of the bar 28. The end supports 25 and 26 have pivoted ends 39 and 40 that extend well past rod 27 so that counterbalance springs 41 may be connected between them and base 10 to enable rack 24 to be easily raised and lowered by hand.

Figure 3:
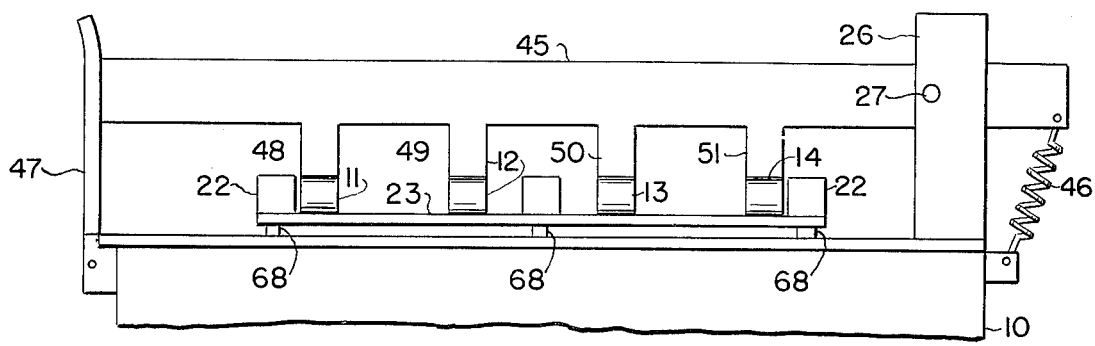
FIG. 3 is a front view of the press taken on line 3—3 of FIG. 1 with the front finger hold down shown lowered to secure fingers prior to the removal of stringers from the bottom boards of a pallet.
Figure 5:
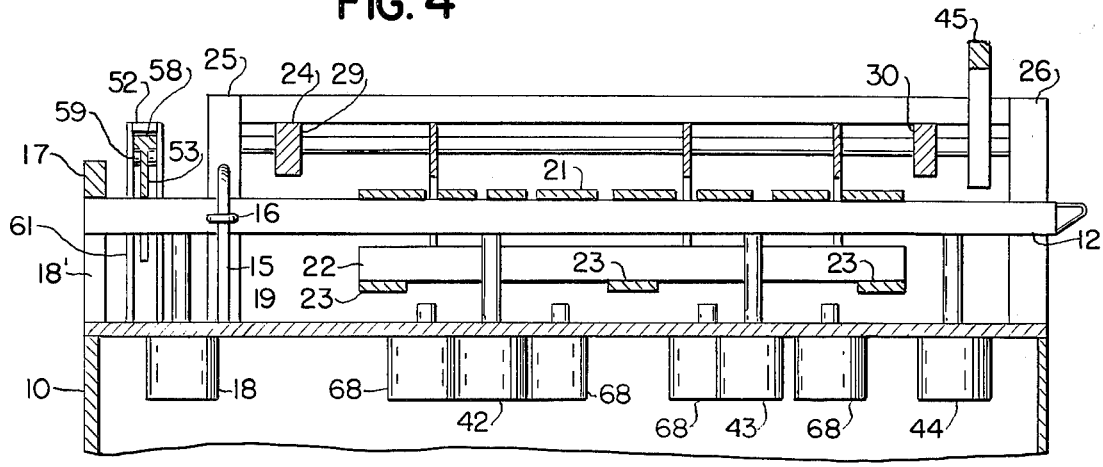
FIG. 5 is a longitudinal vertical section taken on line 5—5 of FIG. 1 showing front and back finger hold downs disengaged, and showing the rack lowered with its thin hold downs engaging the stringers of a pallet while fingers are raised to remove upper boards from the pallet.

As shown in FIG. 5, when the fingers 11-14 are lowered and rack 24 is lowered and hooked by hooks 38, cylinders 18 and cylinders 42, 43, and 44 are activated as a first set so that four cylinders 18, 42, 43, and 44 lift each finger 11-14 to neatly remove all the top boards 21 from a pallet 20. The top boards 21 are taken from the press and the fingers 11-14 are lowered. Frame 24 is raised. As shown in FIG. 3, a front finger hold down 45 pivots on rod 27 and is counterbalanced by a tension spring 46. Hold down 45 is lowered and has its free end secured in a latch 47. Front finger hold down 45 has four downward extensions 48-51 to hold fingers 11-14 in their lowered position.

Figure 4:
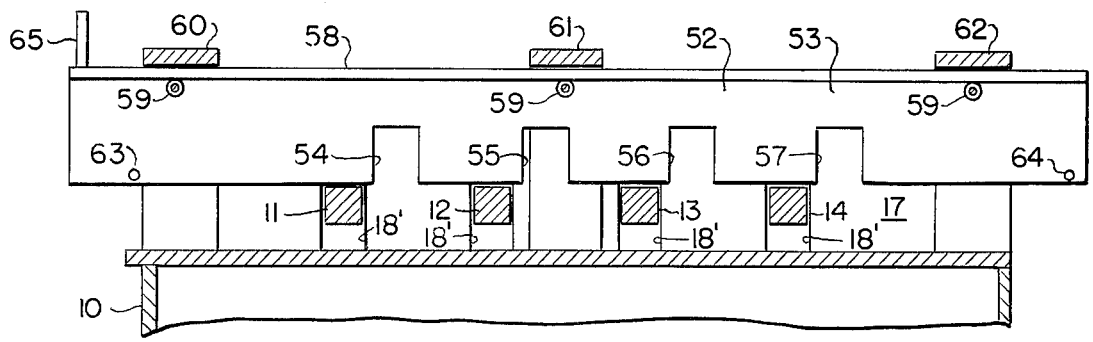
FIG. 4 is a section taken on line 4—4 of FIG. 1 with the back finger hold down shown securing fingers in a lower position.

As shown in FIGS. 1, 4, and 5, a rear finger hold down 52 has a flat plate 53 containing four notches 54-57. A top flange 58 enables hold down 52 to be slidably supported by rollers 59 in the supports 60-62. Stops 63 and 64 limit the lateral movement of the hold down 52 so that it may be engaged or disengaged by sliding it by means of handle 65.

As may be seen in FIGS. 1, 3, and 4, cylinders 68 are fixed in base 10 so their rods will raise the stringers 22 of a pallet from its bottom boards 23. This is shown in FIG. 3. The stringers 22 and the bottom boards 23 are removed from the press to complete the disassembly of a pallet. The cylinders 68 are deactivated and the finger locks or hold downs 45 and 52 are disengaged. The press is then ready for another pallet.

Figure 6:
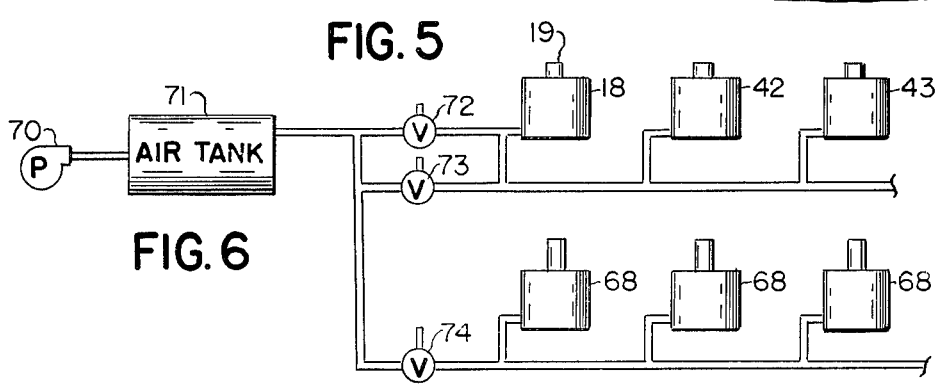
FIG. 6 is a schematic drawing of first and second sets of air cylinders and the air supply and the control valves therefor.

FIG. 6 shows one possible control arrangement for the sets of air cylinders of the press. A pump 70 supplies air to tank 71 from which a line leads to valves 72, 73, and 74. Valve 72 only supplies air to the cylinders 18 of the first set to raise the fingers to slide a pallet thereon. Valve 73 supplies air to all the valves 18, 42, 43, and 44 which comprise the first set of valves to raise the fingers 11-14 with great force. Valve 74 supplies air to cylinders 68 which push the stringers 22 from bottom boards 23 of a pallet. This is just one of many possible control arrangements. The valves 72-74 supply air to cylinders to activate them and vent the cylinders to allow their actuators to retract. As shown, there are twelve cylinders 68 and four each of the cylinders 18, 42, 43, and 44. The numbers of cylinders can be varied.

The press of this invention enables the rapid disassembly of broken pallets with a great saving of labor and with less breakage of boards than is otherwise possible.

While this invention is shown and described in the best form known, it will nevertheless be understood that this is purely exemplary and that modifications may be made without departing from the spirit of the invention.

What is claimed is:

1. A press for the disassembly of pallets having stringers to which top and bottom boards are fixed, said press comprising, in combination, a. a base having a back and a front,
   b. fingers extending from the back of said base over said base so that a pallet may be placed about said fingers with the fingers extending above the pallet bottom boards and below the pallet top boards, c. stringer hold downs having downward projections to extend between top boards of a pallet and to engage stringers of a pallet,
d. means removably mounting said stringer hold downs,
e. means locking said stringer hold downs in a stringer engaging lower position,
f. a first set of cylinders mounted under said base along the lengths of said fingers,
g. means activating said first set of cylinders raising said fingers removing top boards of a pallet while said stringer hold downs secure the stringers of a pallet,
h. front and back finger hold downs securing said fingers in a lower position,
i. a second set of cylinders under said base, and
j. means activating said second set of cylinders to raise stringers of a pallet while said front and back finger hold downs secure said fingers in a lower position to remove the stringers from bottom boards of a pallet.

2. The combination according to claim 1 wherein said means removably mounting said stringer hold downs is a rack having end supports mounted at the front and back of one side of said base, a first rod extending between said end supports, side members pivotally mounted on said first rod, and a second rod joining the free ends of said side members, said stringer hold downs being slidably mounted on said first and second rods.

3. The combination according to claim 2 wherein said means locking said stringer hold downs in a stringer engaging lower position is a hook at the free end of each stringer hold down engaging said base.

4. The combination according to claim 3 with the addition of means counterbalancing said pivotally mounted rack.

5. The combination according to claim 4 with the addition of a transverse rear member mounted at the back of said base and containing slots receiving the back ends of said fingers, and vertical guide means for said fingers mounted on said base in front of said transverse rear member, at least one of said first set of cylinders being disposed between said transverse rear member and said vertical guide means under each finger and being independently activated to raise and cantilever said fingers above said base to receive a pallet thereon.

6. The combination according to claim 5 wherein said back finger hold down is laterally slidable into engaged and disengaged positions, said back finger hold down containing vertical notches to receive said fingers when said back finger hold down is in the disengaged position.

7. The combination according to claim 6 wherein said front finger hold down is pivoted about said first rod and with the addition of a latch mounted on said base, said front finger hold down engaging said fingers when pivoted down over said fingers and secured by said latch.

8. The combination according to claim 7 wherein said cylinders are pneumatic and said means activating said cylinders comprises an air supply and control valves.

* * * * *